(12) United States Patent
Treloar et al.

(10) Patent No.: US 11,713,675 B2
(45) Date of Patent: Aug. 1, 2023

(54) DETERMINING EXPLORATION POTENTIAL RANKING FOR PETROLEUM PLAYS

(71) Applicant: Landmark Graphics Corporation, Houston, TX (US)

(72) Inventors: Michael Charles Quintrell Treloar, Didcot (GB); Owen Edward Sutcliffe, Steventon (GB)

(73) Assignee: Landmark Graphics Corporation, Houston, TX (US)

( * ) Notice: Subject to any disclaimer, the term of this patent is extended or adjusted under 35 U.S.C. 154(b) by 156 days.

(21) Appl. No.: 16/865,063

(22) Filed: May 1, 2020

(65) Prior Publication Data
US 2021/0340867 A1  Nov. 4, 2021

(51) Int. Cl.
*E21B 49/00* (2006.01)
*G01V 99/00* (2009.01)
*G06T 11/60* (2006.01)
*G06T 11/20* (2006.01)

(52) U.S. Cl.
CPC ............ *E21B 49/00* (2013.01); *G01V 99/005* (2013.01); *G06T 11/203* (2013.01); *G06T 11/60* (2013.01)

(58) Field of Classification Search
CPC ..... E21B 49/00; G01V 99/005; G06T 11/203; G06T 11/60; G06T 17/05; G06T 17/20
See application file for complete search history.

(56) References Cited

U.S. PATENT DOCUMENTS

| | | |
|---|---|---|
| 8,749,549 B2 | 6/2014 | Hantschel et al. |
| 2010/0211370 A1 | 8/2010 | Maliassov |
| 2010/0257004 A1 | 10/2010 | Perlmutter et al. |

(Continued)

FOREIGN PATENT DOCUMENTS

| | | | |
|---|---|---|---|
| CN | 111160596 A | | 5/2020 |
| CN | 112330109 A | * | 2/2021 |

(Continued)

OTHER PUBLICATIONS

CN-112330109-A_Translated (Year: 2021).*

(Continued)

*Primary Examiner* — Natalie Huls
*Assistant Examiner* — Michael J Singletary
(74) *Attorney, Agent, or Firm* — Kilpatrick Townsend & Stockton LLP (57) ABSTRACT

A system for determining exploration potential ranking for petroleum plays according to some aspects receives geological survey data of a geographical area to be ranked for a future petroleum play. The system generates predicted values based on the geological survey data, each predicted value indicating a probability that a portion of the basin includes a first characteristic. A set of polygons that represent the basin may be generated based on the predicted values. Each polygon represents a contiguous portion of the basin that has a same predicted value. A basin is score is generated by: generating a score for each polygon using the predicted value; and aggregating the score of each polygon of the set of polygons into the basin score. The basin score is displayed for use displaying for use in determining an area in which drilling a wellbore would have a greater probability of success.

17 Claims, 9 Drawing Sheets

(56) References Cited

U.S. PATENT DOCUMENTS

| | | |
|---|---|---|
| 2011/0264430 A1 | 10/2011 | Tapscott et al. |
| 2015/0192695 A1* | 7/2015 | Wu et al. |
| 2017/0167230 A1* | 6/2017 | Ducros ................. G01V 99/00 |
| 2019/0100997 A1* | 4/2019 | Zou ......................... E21B 41/00 |
| 2020/0123882 A1* | 4/2020 | Kayum ................ G01V 99/005 |

FOREIGN PATENT DOCUMENTS

| | | |
|---|---|---|
| WO | 2010082969 | 7/2010 |
| WO | 2015137943 A1 | 9/2015 |

OTHER PUBLICATIONS

Bachu, "Screening and Ranking of Sedimentary Basins for Sequestration of CO2 in Geological Media in Response to Climate Change", pp. 1-13, 2003.

R.M et al., "A Process for Evaluating Exploration Prospects", AAPG Bulletin, V. 81, No. 7, Jul. 1997, pp. 1087-1109.

Application No. PCT/US2020/031131, International Search Report and Written Opinion, dated Feb. 1, 2021, 11 pages.

CA App. No. CA3,108,193, "Office Action", dated Feb. 22, 2022, 5 pages.

GB App. No. GB2104102.5, "Combined Search and Examination Report", dated Sep. 9, 2021, 5 pages.

GB App. No. GB2104102.5, "Notice of Decision to Grant", dated Apr. 5, 2022, 2 pages.

NO App. No. NO20210387, "Office Action", dated Aug. 12, 2022, 3 pages.

* cited by examiner

DETERMINING EXPLORATION POTENTIAL RANKING FOR PETROLEUM PLAYS

TECHNICAL FIELD

The present disclosure relates generally to hydrocarbon exploration. More specifically, but not by way of limitation, this disclosure relates to determining and outputting data ranking exploration potential of petroleum plays.

BACKGROUND

A petroleum play can include a group of oil fields, basins, prospective oil fields, or prospective basins in the same geographic region that are controlled by the same or similar set of geological circumstances. A play concept can be the combination of petroleum system elements that characterize a particular petroleum play. Geoscientists are routinely tasked with evaluating petroleum play concepts that have the potential to yield viable petroleum plays defining areas for the future placement of wellbores. Evaluating petroleum plays involves defining models for the predicted distribution and effectiveness of the different elements of the petroleum system. However, the degree of variation between petroleum plays prevents one petroleum play from being comparable to another sometimes leading to an arbitrary selection for further exploration

DETAILED DESCRIPTION

Certain aspects and examples of the present disclosure relate to ranking disparate geological domains for exploration potential of future petroleum plays. Geological domains, such as basins, can be evaluated according to the probability of the presence or effectiveness of multiple characteristics that together indicate the potential for further exploration of future well sites. The probability of the presence or effectiveness of each characteristic varies according to geographic portions of the domain. The domain can be represented by a set of polygons, with each polygon indicating the probability of the presence or effectiveness of a particular characteristic. A portion of the domain may be represented by overlapping polygons with each polygon representing different characteristics that apply to that portion of the domain. The probabilities of the characteristics can be combined into composite scores that enable objective comparison and ranking of domains.

In some aspects, the system analyzes information from interactive empirical databases to derive an objective basis for comparing disparate geological domains for exploration potential of future petroleum plays. For example, multi-layered polygons representing the presence or effectiveness of source rock, reservoir, and seal in a basin can be up-scaled, into single-layered composite representations of the domain. Up-scaling the polygons improves the accuracy of integrating multiple characteristics into a composite score. The composite scores retain the information from each layer as layers are ups-scaled. The composite scores are used for comparison and ranking of domains for exploration potential of future petroleum plays.

In some examples, a method assesses, compares, ranks exploration potential of multiple geological domains. A geographical area is divided into a set of geological domains. Each geological domain is represented by a set of geological maps that indicate predicted characteristics of the geological domain. The maps can be categorized and converted into a score of the area represented by the maps. For example, for a reservoir presence map, areas where sand presence is deemed likely could be assigned a value of ten. Whereas areas where the sand presence is deemed possible (e.g., less than likely) could be assigned a value of five.

A score for the domain can be generated by multiplying each score by the proportion of the total area that that particular score occupies. Using the previous example, if the areas of the domain where sand is likely (e.g., assigned a value of ten) covers 25% of the domain, then the score for the domain would be multiplied by 25% (e.g., the score=10*0.25=2.5). This is repeated for each discrete value of the characteristic represented by the map. It is also repeated for other maps, which may represent other characteristics (e.g., reservoir effectiveness, source rock presence, seal presence, etc.).

The scores of each characteristic (e.g., each map of the set of maps) for a basin may not be objectively compared scores of other basins due to each characteristic being represented by varying amorphous portions of the basin. The scores can be combined into composite scores by, for example, overlaying the maps and scores of each characteristic that is being combined. The composite score can be objectively compared to other composite scores. The scores may be normalized for each characteristic and for each domain using the maximum possible score to enable the objective comparison.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
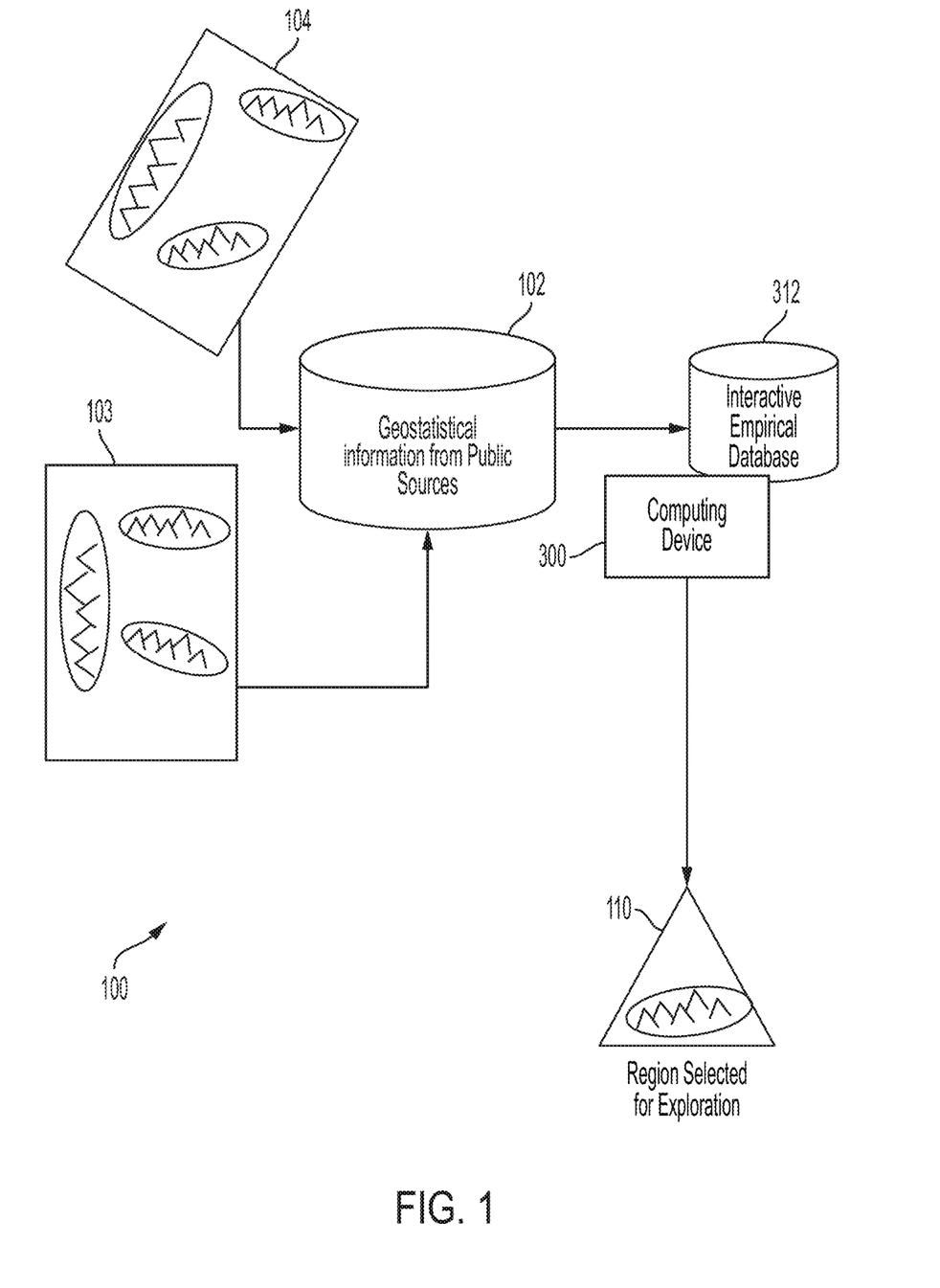
FIG. 1 is a block diagram depicting a system for executing an exploration potential analysis according to some aspects of the disclosure.

FIG. 1 is a schematic block diagram depicting a system 100 for carrying out exploration potential analysis according to some aspects of the disclosure. System 100 includes information 102 from public geological databases as well as published papers and reports. Information 102 may also include information from private sources such as papers and/or reports stored by a private entity or individual. This information describes geological survey information that provides predictions of various characteristics over geographical areas. Geological survey information may be described in unstructured documents that can be stored as files, for example, in computing device 300, such as document 103 and document 104. The unstructured documents include alphanumeric data, maps, or a combination of these or other types of data. In order to be used in the evaluation of exploration potential of future petroleum plays, information 102 is compiled to be globally extensive and to be spatially and stratigraphically enabled, resulting in interactive empirical database 312. Database 312 can include a representation of the unstructured documents stored in information 102. Interactive empirical database 312 is accessed by computing device 300, which can calculate and display a rank of the exploration potential for one or more domains. Ranking domains for exploration potential can enable the selection of domains, such as domain 110, in which to distribute resources for further exploration.

Figure 2:
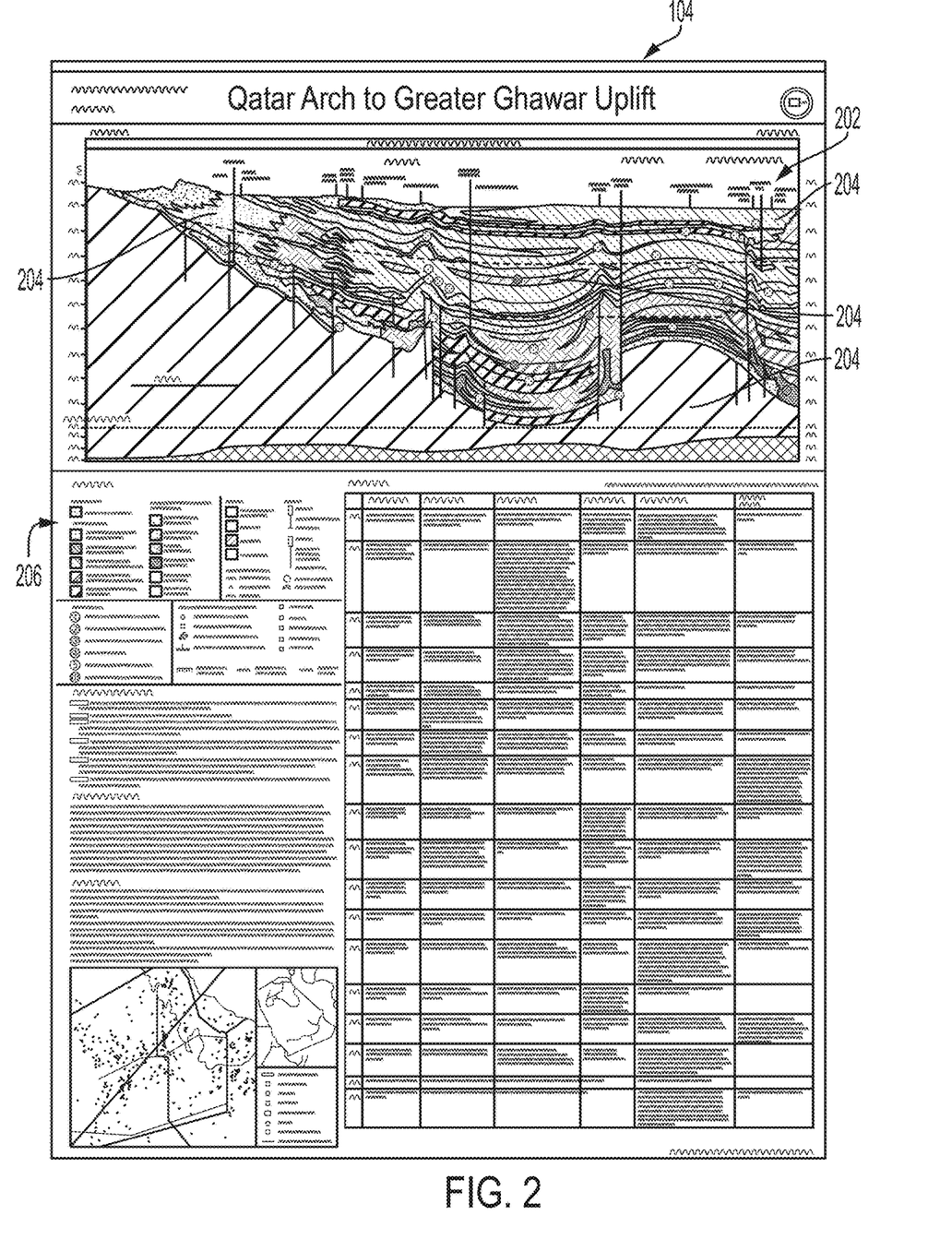
FIG. 2 is an example of an unstructured document used to generate an interactive empirical database according to some aspects of the present disclosure.

FIG. 2 is an example of the unstructured document 104 used to generate the database 312 according to some aspects of the present disclosure. As described above with respect to FIG. 1, the unstructured document 104 may include an area of interest 202. The area of interest 202 may include an area of the unstructured document 104 that includes an image. As illustrated, the area of interest 202 represents a play cross-section of a geological basin. Other examples of the area of interest 202 may include chronostratigraphic charts, geological survey maps, such as map 408 of FIG. 4, or the like. As illustrated, various facies types are depicted by polygons 204. Each of the polygons 204 may include a different color or pattern, as indicated in a legend 206 (i.e., the document property information 106 of FIG. 1). The varying colors are patterns that may represent varying formation properties associated with the portions of the formation represented by the polygons 204.

Each of the polygons 204 of the area of interest 202 may be extracted from the unstructured document 104 in a vectorized form. The extracted, vectorized polygons may be assigned the formation properties represented by the legend 206 and compiled into the interactive empirical database 312. The compilation of the vectorized polygons may be interactive and adjustable within the interactive empirical database 312. Further, geospatial information (e.g., geographical coordinates) included in the unstructured document 104 may provide the vectorized polygons with a geographical reference frame for use within the interactive empirical database 312.

Figure 3:
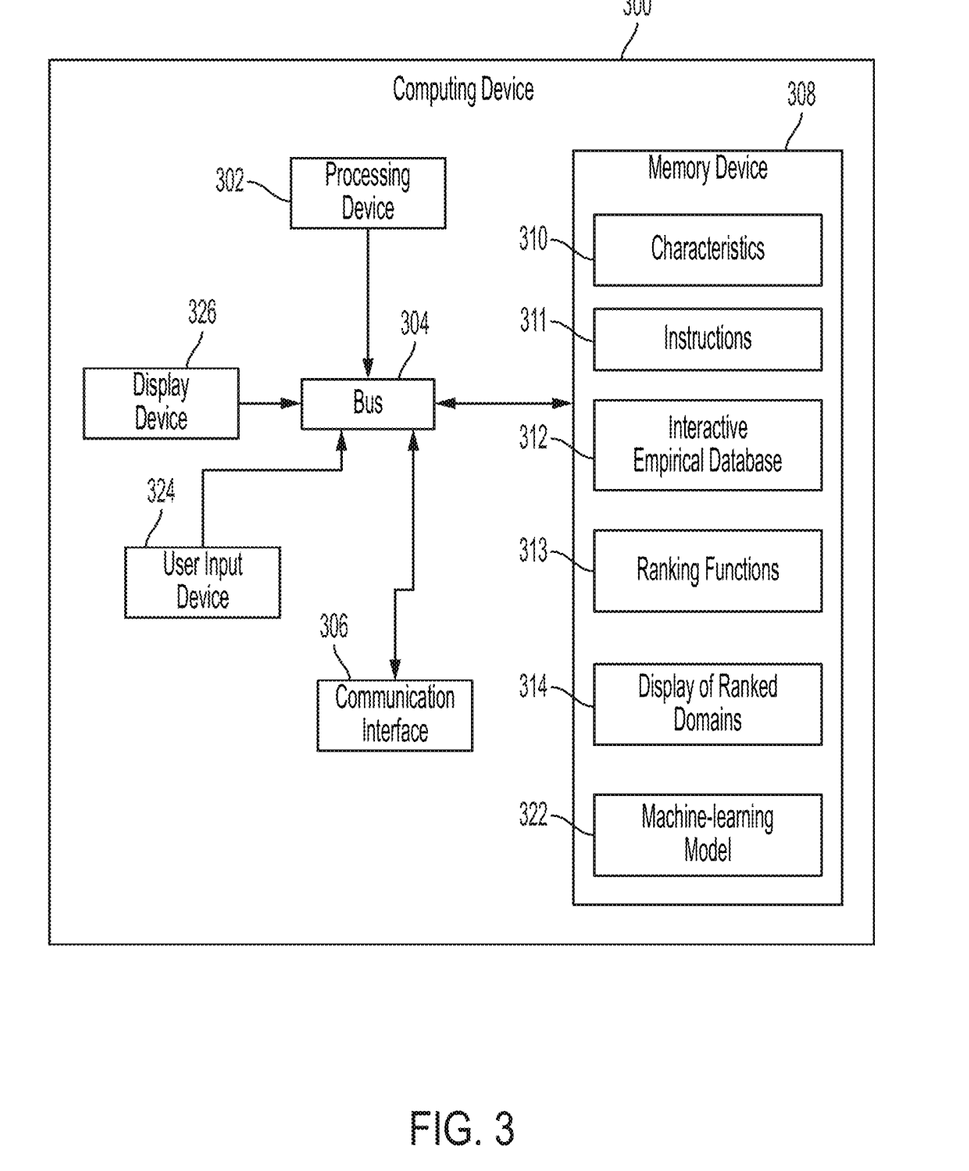
FIG. 3 is a block diagram depicting a computing device for executing exploration potential analysis according to some aspects of the disclosure.

FIG. 3 depicts an example of the computing device 300 according to one example. The computing device 300 can include a processing device 302, a bus 304, a communication interface 306, a non-transitory or non-volatile memory device 308, a user input device 324, and a display device 326. In some examples, some or all of the components shown in FIG. 3 can be integrated into a single structure, such as a single housing. In other examples, some or all of the components shown in FIG. 3 can be distributed (e.g., in separate housings) and in communication with each other.

The processing device 302 can execute one or more operations for scoring and ranking exploration potential. The processing device 302 can execute instructions 311 stored in the memory device 308 that are executable by the processing device 302 to perform the operations. The processing device 302 can include one processing device or multiple processing devices. Non-limiting examples of the processing device 302 include a Field-Programmable Gate Array ("FPGA"), an application-specific integrated circuit ("ASIC"), a microprocessing device, etc.

The processing device 302 can be communicatively coupled to the memory device 308 via the bus 304. The non-volatile memory device 308 may include any type of memory device that retains stored information when powered off. Non-limiting examples of the memory device 308 include electrically erasable and programmable read-only memory ("EEPROM"), flash memory, or any other type of non-volatile memory. In some examples, at least some of the memory device 308 can include a non-transitory medium from which the processing device 302 can read instructions. A non-transitory computer-readable medium can include electronic, optical, magnetic, or other storage devices capable of providing the processing device 302 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In some examples, the memory device 308 can include characteristics 310 that correspond to properties of basins used to develop composite rankings, such as, but not limited to, the presence of seal, reservoir, source rock, etc. or the effectiveness of the seal, reservoir, source rock, etc. In some examples, the computer program instructions 311 determine geospatial areas of basins that correspond to a predictive value of a characteristic and generate polygons overlaid on maps of the basin and representing the predictive value. The memory device 308 can also include the interactive empirical database 312, with information gathered from one or more public geological databases as well as published papers, maps, and reports. The memory device 308 can include stored basin data structures, which can be drawn upon to produce a display of ranked basins according to exploration potential with overall ranks as well as ranks for individual characteristics. The memory device 308 can also include a machine-learning model 322, such as a classifier, that can be used to generate predictive values for characteristics of a basin.

In some examples, the computing device 300 includes a communication interface 306. The communication interface 306 can represent one or more components that facilitate a network connection or otherwise facilitate communication between electronic devices. Examples include, but are not limited to, wired interfaces such as Ethernet, USB, IEEE 1394, and wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network). The interactive empirical database 312 can reside remotely or in a cloud-based storage system, in which case the database would be accessed over the communication interface connected to a network.

In some examples, the computing device 300 includes a user input device 324. The user input device 324 can represent one or more components used to input data. Examples of the user input device 324 can include a keyboard, mouse, touchpad, button, or touch-screen display, etc. The user input device can be used to initiate calculations and provide input regarding how statistical probabilities and other information is displayed. In some examples, the computing device 300 includes a display device 326, which can display exploration potential analysis information including the probability of success for a proposed play concept or an inventory of proposed play concepts. The display device 326 can represent one or more components used to output data. Examples of the display device 326 can include a liquid-crystal display (LCD), a television, a computer monitor, a touch-screen display, etc. In some examples, the user input device 324 and the display device 326 can be a single device, such as a touch-screen display.

In some examples, the interactive empirical database 312 is compiled to be globally extensive and to be spatially and stratigraphically enabled. The information in the database is leveraged to calculate ranks indicative of the exploration potential of basins and to compare basins according the ranks. This assessment is based on data including the presence or effectiveness of source rocks, reservoirs, seals, etc. and other characteristics of the domain such as trap density, reservoir composition, paleoclimate, tectonic regime, etc. The data used in the database can be gathered so that assessments of geographically diverse basins are a heterogeneous enabling objective comparison of the basins and their characteristics.

While the database in the example discussed above is global, a regional database could be used. Such a regional database would be based on information gathered from regional datasets, which may be useful in the evaluation of basins with the region, but less useful in evaluating basins in other regions.

Figure 4:
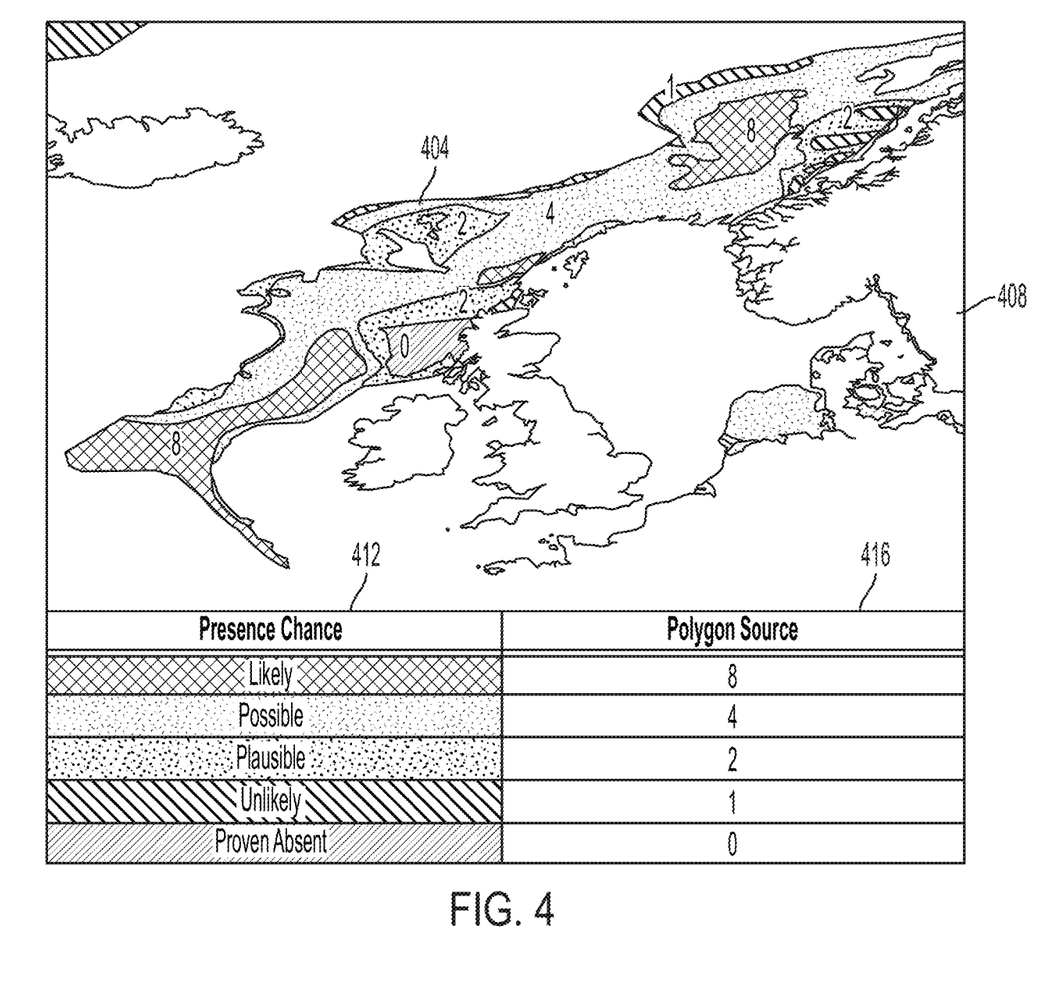
FIG. 4 is an example of overlaying polygons onto a map of a geographical area that represents a probability of the presence of source rock according to some aspects of the disclosure.

FIG. 4 is an example of overlaying polygons 404 onto map 408 of geographical area that represents a probability of the presence of source rock according to some aspects of the disclosure. A map 408 of a geographical area to be assessed may be obtained from information 102. The geographical area can include at least one domain (e.g., such as a basin) that can be assessed for exploration potential based on the information. The domain can be evaluated using data from interactive empirical database 312. The data includes predicted values for one or more characteristics across discrete portions of the domain. A predicted value may correspond to a probability of a presence or effectiveness of a characteristic over the discrete portion of the domain. In some instances, the entire geographical area may be assessed. In other instances, a predetermined portion of the geographical area may be assessed, such as a portion that corresponds to a domain, a portion selected by user input, a portion that corresponds to historical explorations, a portion that corresponds to current drilling operations, or the like.

As depicted in map 408, a domain is assessed for a particular characteristic. Using the data from interactive empirical database 312, a predicted value for the characteristic is determined for portions of the domain. The predicted value may be equal to one of a predetermined set of binned values 412. For example, the binned values may correspond to proven absent, unlikely, plausible, possible, likely, and the like. In other instances, the predicted value may equal to a numerical value indicating a probability (e.g., any real number between 0 and 1, or like.

A first set of polygons 404 representing the characteristic over the domain can be generated and overlaid on map 408. Each polygon of the first set of polygons may correspond to a contiguous area of the domain that corresponds to a same predicted value. A numerical polygon score 416 can be assigned to each binned value and by extension to each polygon. For instance, a polygon of a predicted value of likely for the presence of a characteristic over the area represented by the polygon can be assigned a high numerical score such as eight as shown. A polygon of a predicted value of proven absent for the presence of a characteristic can be given a low score such as zero, null, or the like.

The first set of polygons 404 represented in FIG. 4 represent the predicted values of a single characteristic. A subsequent set of polygons can be generated for each additional characteristic for which the domain is evaluated. Each subsequent set of polygons can be overlaid on map 408 (e.g., on top of the first set of polygons 404, or in place of the first set of polygons 404). The subsequent set of polygons can be merged with the first set of polygons in the process of generating an overall score for the domain as described in connection to FIG. 6. The area of the geographical area covered by each subsequent set of polygons may be equal to the area covered by the first set of polygons 404 or each subsequent set of polygons may correspond to different areas of the geographical area. Each set of polygons (e.g., the first set of polygons and each subsequent set of polygons) may cover the portion of the geographical area that corresponds to a domain. The polygons may be combined generating composite scores of a combination of characteristics assessed. These composite scores may be combined to form a basin score for the basin.

Figure 5:
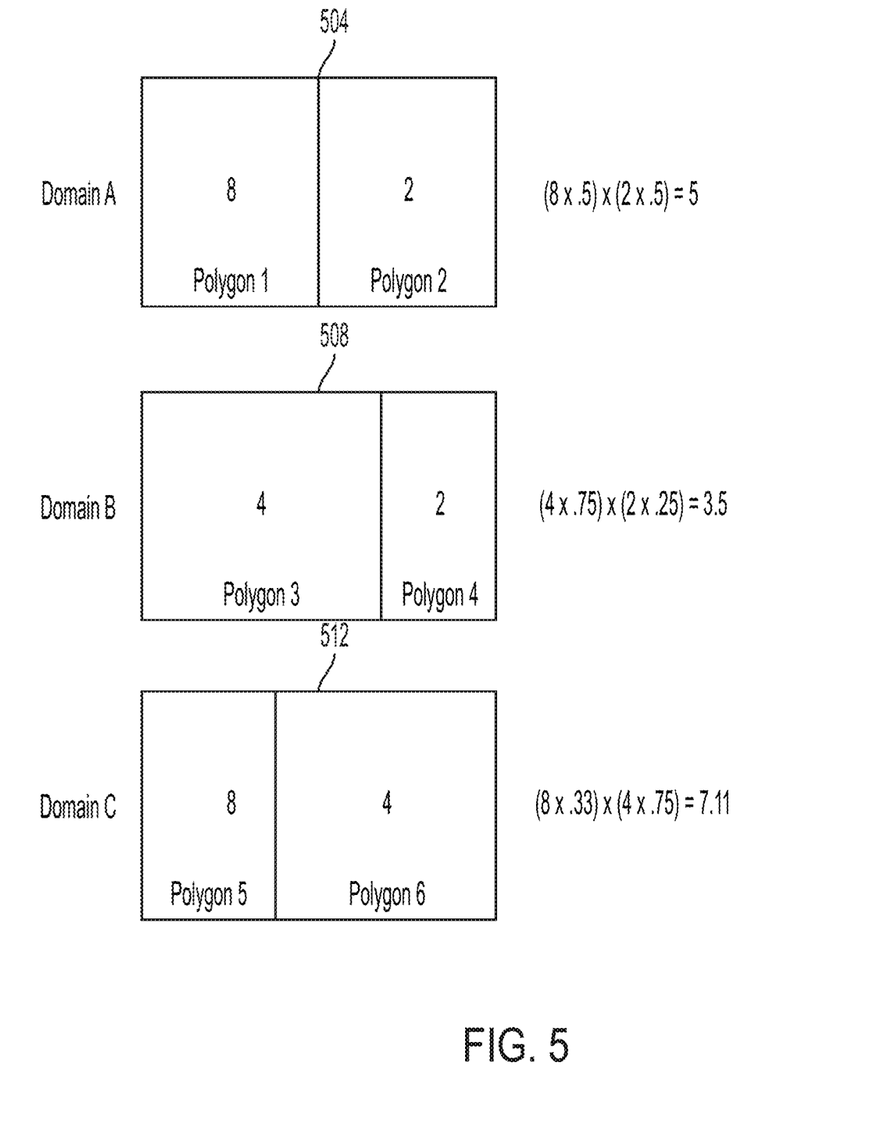
FIG. 5 is an example of determining aggregated polygon scores for a particular characteristic according to some aspects of the disclosure.

FIG. 5 is an example calculation of aggregated polygon scores for a particular characteristic according to some aspects of the disclosure. Each polygon represents a contiguous area of the domain that has a same predicted value of particular characteristic. The predicated value corresponding to a probability of a presence or effectiveness of a particular characteristic. Each polygon is then assigned a score based on the predictive value. The scores of all polygons of a particular characteristic may be aggregated into a single score that corresponds to the particular characteristic. This may be repeated for each of the multiple layers of polygons which each layer representing a different characteristic. These scores can be used to facilitate comparison between geographically separate domains for a particular characteristic as shown in FIG. 5. The aggregated score of each layer of polygons may be aggregated again into a score for the domain (e.g., a basin score).

The scores of polygon 1 and polygon 2 can be aggregated into a single score by multiplying the scores of each polygon based on the relative area covered by the polygon. For instance, the aggregate score for the domain for the characteristics can be determined by $\Pi(P_n * A_n)$, where $P_n$ represents the score assigned to a polygon and $A_n$ represents a percentage of the area of the domain represented by the polygon.

As depicted in FIG. 5, domain A 504, domain B 508, and domain C 512 represent geographically separate domains that are evaluated according to a same characteristic. Domain A 504 includes two polygons that represent approximately the same relative area of the domain. Polygon 1 represents 50% of the area of the domain and is assigned a score of 8. Polygon 2 represents 50% of the area of the domain and is assigned a score of 2. The aggregated score of domain A 504 can be determined by (8*0.5)(2*0.5)=5. Domain B 508 includes two polygons: polygon 3 that represents 75% of the area of the domain and is assigned a score of 4 and polygon 4 that represents the remaining 25% of the domain and is assigned a score of 2. The aggregated score of domain B is determined by (4*0.75)(2*0.25)=3.5. Domain C 512 includes two polygons: polygon 5 that represents 33% of the domain and is assigned a score of 8 and polygon 6 that represents the remaining 66% of the domain and is assigned a score of 4. The aggregated score of domain B is determined by (8*0.33)(4*0.66)=7.11. The calculated scores of each domain render each domain comparable for the particular characteristic. The scores provide an objective basis to compare each domain despite particular features that may be specific to each domain.

Figure 6:
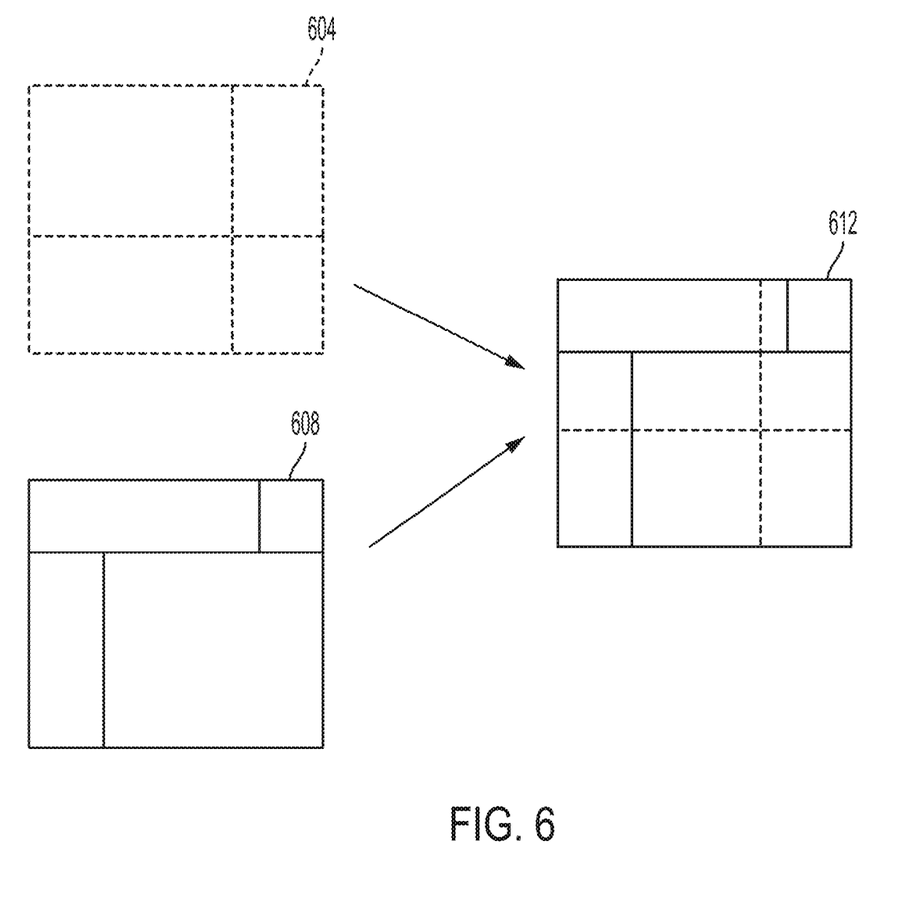
FIG. 6 is an example of merging polygons to generate composite scores according to some aspects of the disclosure.

FIG. 6 is an example of merging polygons to generate composite scores according to some aspects of the disclosure. A first set of polygons representing a first characteristic and a second set of polygons representing a second characteristic can be merged into a third set of polygons. The scores of the polygons of the third set of polygons are based on the scores of the first set of polygons and the second set of polygons. The scores of the third set of polygons can be aggregated into a single score that represents a score of the domain based on the two characteristics.

For instance, a first set of polygons 604 includes polygons that may represent a first characteristic. Each polygon of the first set of polygons 604 is assigned a score that represents a probability that property (e.g., presence, effectiveness, or the like) associated with the first characteristic applies to the portion of the basin represented by the polygon. A second set of polygons 608 includes polygons that may represent a second characteristic. Each polygon of the second set of polygons 608 is assigned a score that represents a probability that a property associated with the second characteristic applies to a portion of the domain represented by the polygon. In some instances, the second characteristic may be the same as the first characteristic, but the property associated with the second characteristic may be different. For instance, the first score may correspond to a presence of a first characteristic and the second score may correspond to an effectiveness of the first characteristic.

The second set of polygons 608 may be overlaid onto the first set of polygons 604 (or vice versa) to generate the third set of polygons 612. A first polygon from the first set of polygons 604 and that overlaps with a second polygon from the second set of polygons 608 generates a polygon in the third set of polygons 612 with an area equal to the portion first polygon and the second polygon that overlap. The score assigned to the polygon of the third set of polygons 612 is equal to the sum of the score of the first polygon and the score of the second polygon. The score assigned to each polygon of the third set of polygons 612 is equal to the sum of the scores of the polygons from the first set of polygons 604 and the second set of polygons that overlap to generate the polygon of the third set of polygons 612. In some instances, the score assigned to each polygon of the third set of polygons 612 is equal to the product of the scores of the polygons from the first set of polygons 604 and the second set of polygons that overlap to generate the polygon of the third set of polygons 612. For example, the first set of polygons 604 is represented with dotted lines to show how the overlapping polygons generate new polygons in the third set of polygons 612.

In some instances, the combined area represented by the first set of polygons 604 is equal to the combined area represented by the second set of polygons 608. In other instances, the combined area represented by the first set of polygons 604 is not equal to the combined area represented by the second set of polygons 608. In those instances, if a portion of a particular polygon does not overlap with another polygon, the portion of the particular polygon will be a new polygon in the third set of polygons with a score equal to the score of the particular polygon.

Figure 7:
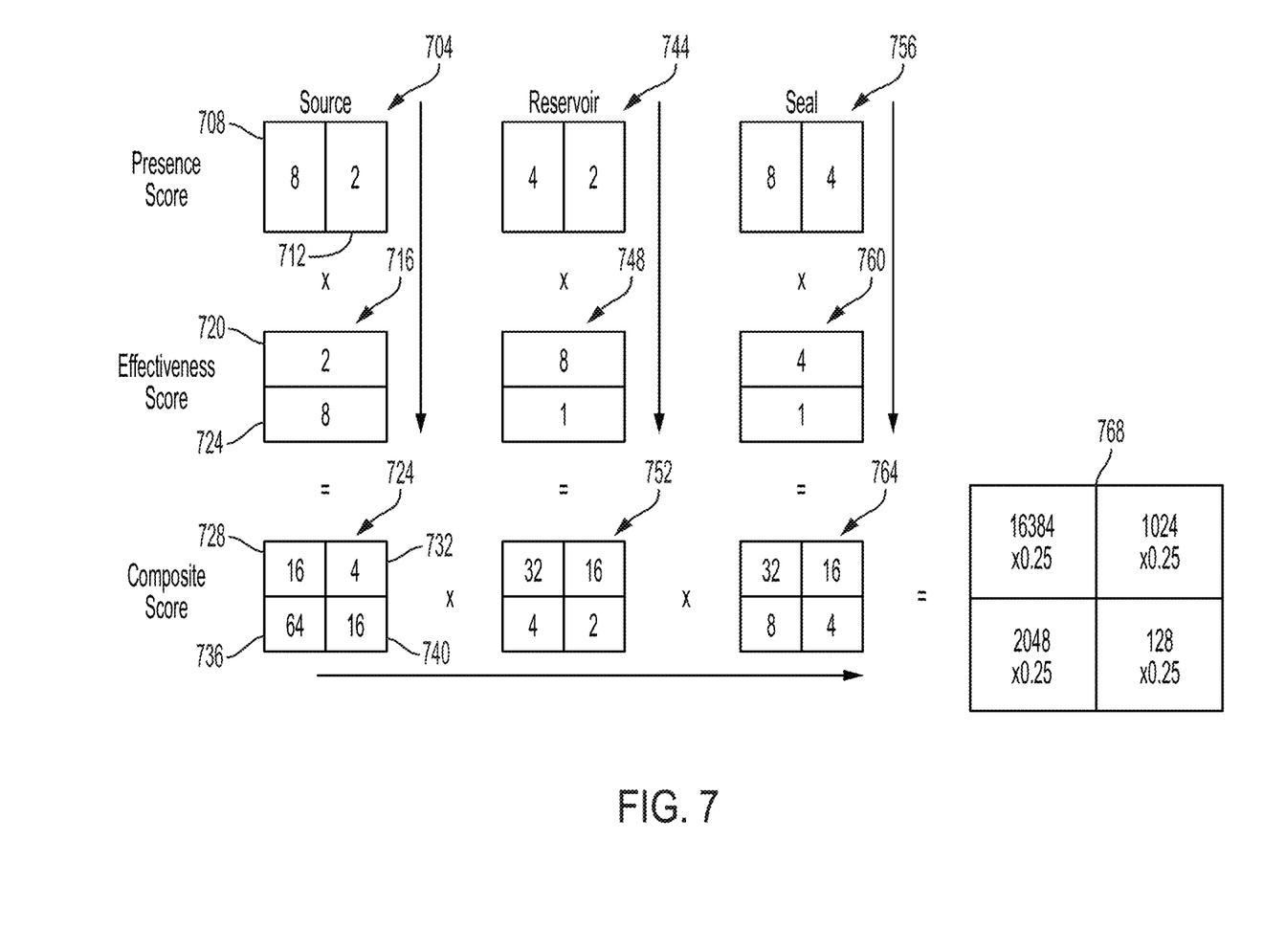
FIG. 7 is an example of generating a domain score from multiple characteristics according to some aspects of the disclosure.

FIG. 7 is an example of generating a domain score from multiple characteristics according to some aspects of the disclosure. Combining characteristics into a single domain score includes systematically combining sets of polygons into a single set of polygons and generating the domain score from the single set of polygons as described in connection with FIG. 5.

The example depicted by FIG. 7 includes scores for three characteristics (e.g., source, reservoir, and seal), each of which having two properties (e.g., presence, effectiveness) which produces six sets of polygons (e.g., source rock presence, reservoir presence, seal presence, source rock effectiveness, reservoir effectiveness, and seal effectiveness). First, the sets of polygons corresponding to a same characteristic are combined into a single composite score. For example, a set of polygons representing the source rock presence 704 is combined with a set of polygons representing source rock effectiveness 716 to generate a source rock composite score 724 for the source rock characteristic.

The source rock composite score 724 is a set of polygons generated from the combination of the source rock presence 704 and source rock effectiveness 716 in a same manner as described by FIG. 6. For instance, the source rock composite score includes four polygons that are made up of the overlap of the set of polygons representing the source rock presence 704 is combined with the set of polygons representing source rock effectiveness 716. The scores of each polygon of the source rock composite score 724 is equal to the product of overlapping polygons from the source rock presence 704 and source rock effectiveness 716. For example, a portion of polygon 708 overlaps with a portion of polygon 720 to form polygon 728. The score of the new polygon 728 is equal to the product of the score of polygon 708 (e.g., 8) and polygon 720 (e.g., 2), which is 16. Polygon 732 is equal to 4 (e.g., the product of polygon 712 and polygon 716). Polygon 736 is equal to 64 (e.g., the product of polygon 708 and polygon 724). Polygon 40 is equal to 16 (e.g., the product of polygon 712 and polygon 724).

A similar process is performed to combine the set of polygons representing reservoir presence 744 and reservoir effectiveness 748 to generate a reservoir composite score 752. A similar process is also performed to combine the set of polygons representing seal presence 756 and seal effectiveness 760 to generate a seal composite score 764. A similar process then combines the composite scores 724, 752, and 764 into a domain composite score 768.

A single domain score may be derived from the domain composite score 768 by calculating the product of each polygon relative to the percentage of the domain represented by the polygon as described in connection to FIG. 5. For instance, each polygon of the domain composite score represents 25% of the domain. The domain score is calculated by $\Pi(P_n*A_n)$=(16384*25%)*(1024*25%*(2048*25%)*(128*25%)=4,896. Though the polygons of depicted in the example of FIG. 7 are simple shapes, the polygons may of any shape including amorphous shapes.

Figure 8:
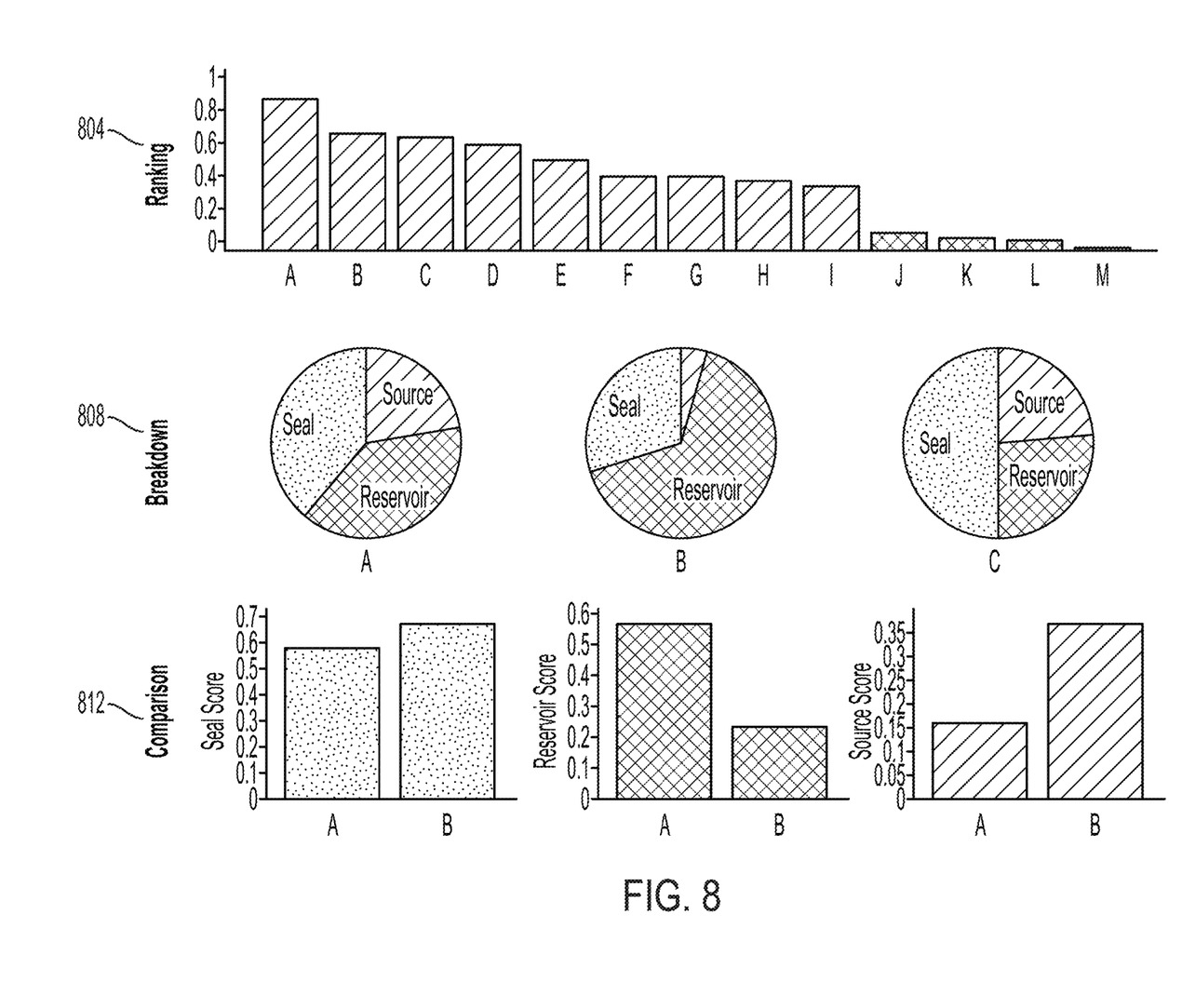
FIG. 8 is an example of a graphical user interface display comparing basins according to some aspects of the disclosure.

FIG. 8 is an example of domain graphs for the comparison of domains according to some aspects of the disclosure. Evaluating domains for exploration potential can include the presentation of domain scores, such as numerical scores, grades (e.g., such A-F), graphs of characteristics evaluated from each domain, rankings, or the like. For instance, a first graph 804 can be a bar graph depicting a ranking of domains A-M for exploration potential based on domain scores. Domains with a higher domain score such as domain A are presented before domains with a lower basin score such as domain M. Although a bar graph is depicted, any graph that represents the ranking of domains may be used.

Graphs 808 correspond to the top three domains (e.g., A, B, and C) of graph 804 and show the relative scores of three characteristics used to generate the domain score. Graphs 804 may represent the constituent scores (e.g., scores of each characteristic) of a domain score to aid in the identification of key risks in each domain. Graphs 808 are represented as pie charts, but like graph 804 may be represented as any graph configured to provide a representation of each of the one or more characteristics involved in the generation of a domain score. Graphs 808 may be displayed in a same user interface. The user interface may include any number of graphs including more than three or less than three.

Graphs 812 provide a comparison of the characteristic scores of two domains. In this example, graph 812 includes a bar graph for each characteristic evaluated, with each bar chart representing the score for a characteristic from domain A and a score of the characteristic from domain B. For example, a first bar graph provides a comparison of the seal score between domain A and domain B, a second bar graph provides a comparison of the reservoir score of domain A and domain B, and a third graph provides a comparison of the source rock score of domain A and domain B. The bar graphs may be configured to represent a comparison of any number of domains and any number of characteristics. The data represented by each graph may be normalized to the maximum score possible to allow for different parameters to be compared on a consistent scale. Graphs 812 may be represented as any type of graph configured to provide a representation of a comparison between domains.

Figure 9:
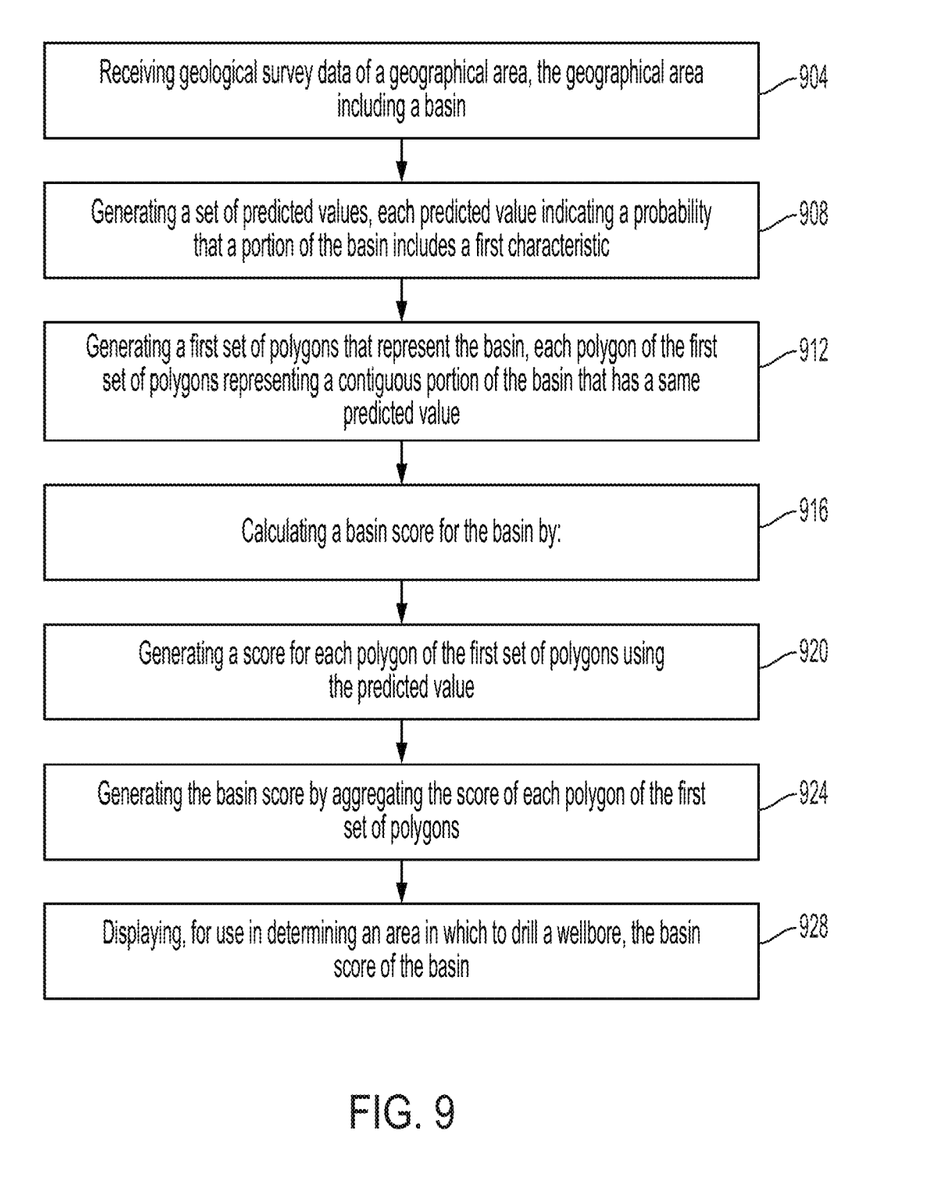
FIG. 9 is an example of a process of generating basin scores according to some aspects of the disclosure.

FIG. 9 is an example of a process of generating domain scores according to some aspects of the disclosure. A block 904, geological survey data of a geographical area is received. The geographical area includes at least one basin. The geological survey data may be received from an interactive empirical database. The geological survey data may be compiled from one information available from public geological databases, journals, and publicly available geoscience reports and stored in the interactive empirical database.

At block 908, a set of predicted values are generated for the basin based on the geological survey data. Each predicted value may be a probability that a property associated with a characteristic applies to a portion of the basin. Examples of properties include, but are not limited to presence, effectiveness, and the like. Examples of characteristics include, but are not limited to, seal, reservoir, source rock, trap density, reservoir composition, paleoclimate, tectonic regime, and the like. For example, for properties of presence and effectiveness and characteristics of source rock, reservoir, and seal, the predicted values can include: a presence of source rock, a presence of a reservoir, a presence of a seal, an effectiveness of the source rock, an effectiveness of the seal, and an effectiveness of the reservoir. At block 912, a first set of polygons that represent the basin may be generated. Each polygon of the first set of polygons represents a contiguous portion of the basin that has a same predicted value.

At block 916, a basin score may be generated for the basin by, at block 920, generating a score for each polygon based on the predicted value. For instance, the predicted values may be binned into ranges of values. A score may be assigned to each bin of ranged values such that polygons that have a predicted value that corresponds to particular bin may be assigned the score that corresponds to that bin. For instance, if the property corresponds to a presence of a characteristic, the score assigned to each polygon corresponds to a presence score for the characteristic that indicates the probability of the presence of the characteristic over the geographical area covered by the polygon. If the property corresponds to a effectiveness of a characteristic, the score assigned to each polygon corresponds to an effectiveness score for the characteristic that indicates the probability of the effectiveness of the characteristic over the geographical area covered by the polygon.

In some instances, predicted values corresponding to one or more other characteristics may be generated. A set of polygons may be generated for each set of predicted values that correspond to a same characteristic. A score may be assigned to each polygon of each set of polygons as described above in connection to FIG. 4. The sets of polygons may be overlaid onto the first set of polygons. This may breakup some of the polygons of the first set of polygons into smaller polygons due the intersections between the overlapping polygons as described in connection to FIG. 6. The scores of the first set of polygons may be updated based on the scores of the sets of polygons. For example, the score of each polygon of the first set of polygons may correspond to the product of the polygons from the first set of polygons and the scores of all of the polygons that overlap with that polygon as described in connection to FIG. 7.

At block 924, a basin score is generated by aggregating the scores of each polygon of the first set of polygons. Aggregating the scores to each polygon may be normalized based on a percentage of the area represented by each polygon. For example, the basin score may be calculated by $\Pi(P_n * A_n)$, where $P_n$ represents the score assigned to a polygon and $A_n$ represents a percentage of the area of the domain represented by the polygon. Alternatively, $\Sigma(P_n * A_n)$ may be used.

At block 928, the basin score is displayed for use in indicating the exploration potential of the basin and for the selection of an area in which to drill a wellbore. The display may include the scores of each polygon, the predicted value, a representation of each polygon overlaid onto a map of the basin, combinations thereof and the like. The basin score may be displayed along with a basin score of one or more other basins so as to provide an indication of the exploration potential of basin relative to the exploration potential of the one or more other basins. The display may also include an indication of the characteristics used to generate the basin score, an indication of the characteristics used to generate the one or more other basin scores, a comparison of the scores of each characteristic with the scores of each characteristic of the one or more other basins, combinations thereof, and the like. If there are more basins to evaluate, the process may return to block 904 in which geological survey information for a new basin may be received and evaluated for exploration potential.

In some aspects, a system for determining exploration potential rankings for petroleum plays is provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a computing device comprising: a processing device; and a non-transitory memory device comprising instructions that are executable by the processing device to cause the processing device to perform operations comprising: receiving geological survey data of a geographical area, the geographical area including a basin; generating, based on the geological survey data, a set of predicted values, each predicted value indicating a probability that the first portion of the basin includes a first characteristic; generating, based on the set of predicted values, a first set of polygons that represent the basin, each polygon of the first set of polygons representing the first portion of the basin that has a same predicted value; calculating a basin score for the basin by: generating a score for each polygon of the first set of polygons using the predicted value; and generating the basin score by aggregating the score of each polygon of the first set of polygons; and displaying, for use in determining an area in which drilling a wellbore would have a greater probability of success, the basin score of the basin.

Example 2 is the computing device of example 1, wherein generating the score includes: generating, for each polygon of the first set of polygons, a weighted predicted value using the predicted value and an area of the polygon.

Example 3 is the computing device of any of examples 1-2, wherein the operations further comprise: generating, based on the geological survey data, a set of effectiveness scores, each effectiveness score indicating a second portion of the basin that includes a predicted degree of effectiveness of the first characteristic; and generating, based on the set of effectiveness scores; a second set of polygons that represent the basin, each polygon of the first set of polygons representing the second portion of the basin that has a same effectiveness score, wherein calculating the basin score for the basin further includes: stacking the second set of polygons onto the first set of polygons; and adding new polygons to the first set of polygons based on intersections between polygons of the first set of polygons with polygons of the second set of polygons.

Example 4 is the computing device of any of examples 1-3, wherein the score is equal to a product of the predicted value of a particular polygon of the first set of polygons and the effectiveness score of a polygon of the second set of polygons that is stacked on the particular polygon.

Example 5 is the computing device of any of examples 1-4, wherein the operations further comprise: displaying a second basin score of a second basin next to the basin score.

Example 6 is the computing device of any of examples 1-5, wherein the operations further comprise: displaying the first set of polygons by overlaying the first set of polygons onto a map of the geographical area.

Example 7 is the computing device of any of example 1-6, wherein the first characteristic a source rock, a reservoir, or a seal.

Example 8 is a method comprising: receiving, by a processing device, geological survey data of a geographical area, the geographical area including a basin; generating, by the processing device and based on the geological survey data, a set of predicted values, each predicted value indicating a probability that a first portion of the basin includes a first characteristic; generating, by the processing device and based on the set of predicted values, a first set of polygons that represent the basin, each polygon of the first set of polygons representing the first portion of the basin that has a same predicted value; calculating, by the processing device, a basin score for the basin by: generating, by the processing device, a score for each polygon of the first set of polygons using the predicted value; and generating, by the processing device, the basin score by aggregating the score of each polygon of the first set of polygons; and displaying, by the processing device for use in determining an area in which drilling a wellbore would have a greater probability of success, the basin score of the basin.

Example 9 is the method of example 8, wherein generating the score includes: generating, by the processing device, for each polygon of the first set of polygons, a weighted predicted value using the predicted value and an area of the polygon.

Example 10 is the method of any of example 8-9, further comprising: generating, by the processing device and based on the geological survey data, a set of effectiveness scores, each effectiveness score indicating a second portion of the basin that includes a predicted degree of effectiveness of the first characteristic; and generating, by the processing device and based on the set of effectiveness scores; a second set of polygons that represent the basin, each polygon of the first set of polygons representing the second portion of the basin that has a same effectiveness score, wherein calculating the basin score for the basin further includes: stacking by the processing device, the second set of polygons onto the first set of polygons; and adding, by the processing device, new polygons to the first set of polygons based on intersections between polygons of the first set of polygons with polygons of the second set of polygons.

Example 11 is the method of any of example 8-10, wherein the score is equal to a product of the predicted value of a particular polygon of the first set of polygons and the effectiveness score of a polygon of the second set of polygons that is stacked on the particular polygon.

Example 12 is the method of any of example 8-11, further comprising: displaying, by the processing device, a second basin score of a second basin next to the basin score.

Example 13 is the method of any of example 8-12, further comprising: displaying the first set of polygons by overlaying the first set of polygons onto a map of the geographical area.

Example 14 is the method of any of example 8-13, wherein the first characteristic a source rock, a reservoir, or a seal.

Example 15 is a non-transitory computer-readable medium that includes instructions that are executable by a processing device for causing the processing device to perform operations comprising: receiving geological survey data of a geographical area, the geographical area including a basin; generating, based on the geological survey data, a set of predicted values, each predicted value indicating a probability that a first portion of the basin includes a first characteristic; generating, based on the set of predicted values, a first set of polygons that represent the basin, each polygon of the first set of polygons representing the first portion of the basin that has a same predicted value; calculating a basin score for the basin by: generating a score for each polygon of the first set of polygons using the predicted value; and generating the basin score by aggregating the score of each polygon of the first set of polygons; and displaying, for use in determining an area in which drilling a wellbore would have a greater probability of success, the basin score of the basin.

Example 16 is the non-transitory computer-readable medium of example 15, wherein generating the score includes: generating, for each polygon of the first set of polygons, a weighted predicted value using the predicted value and an area of the polygon.

Example 17 is the non-transitory computer-readable medium of any of examples 15-16, wherein the operations further comprise: generating, based on the geological survey data, a set of effectiveness scores, each effectiveness score indicating a second portion of the basin that includes a predicted degree of effectiveness of the first characteristic; and generating, based on the set of effectiveness scores; a second set of polygons that represent the basin, each polygon of the first set of polygons representing the second portion of the basin that has a same effectiveness score, wherein calculating the basin score for the basin further includes: stacking the second set of polygons onto the first set of polygons; and adding new polygons to the first set of polygons based on intersections between polygons of the first set of polygons with polygons of the second set of polygons.

Example 18 is the non-transitory computer-readable medium of any of examples 15-17, wherein the score is equal to a product of the predicted value of a particular polygon of the first set of polygons and the effectiveness score of a polygon of the second set of polygons that is stacked on the particular polygon.

Example 19 is the non-transitory computer-readable medium of any of examples 15-18, wherein the operations further comprise: displaying a second basin score of a second basin next to the basin score.

Example 20 is the non-transitory computer-readable medium of any of examples 15-29, wherein the operations further comprise: displaying the first set of polygons by overlaying the first set of polygons onto a map of the geographical area.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A computing device comprising:
a processing device; and
a non-transitory memory device comprising instructions that are executable by the processing device to cause the processing device to perform operations comprising:
receiving one or more unstructured electronic documents that include geological survey data of a geographical area and geographical coordinates associated with the geographical area, the geographical area including a basin;
extracting, from the one or more unstructured electronic documents, a plurality of vectorized polygons associated with an area of interest of the geographical area;
generating, based on the one or more unstructured electronic documents, an interactive empirical database by:
generating, based on the unstructured electronic documents, a set of predicted values, each predicted value indicating a probability that a first portion of the basin includes a first characteristic;
generating, based on the set of predicted values, the unstructured electronic documents, and the plurality of vectorized polygons, a first set of vectorized polygons that represent the basin, each polygon of the first set of vectorized polygons representing the first portion of the basin that has a same predicted value;
generating, based on the geographical coordinates, a geographical reference frame associated with the plurality of vectorized polygons;
overlaying the first set of vectorized polygons onto a map of the geographical area;
calculating a basin score for the basin by:
generating a presence score for each vectorized polygon of the first set of vectorized polygons using the predicted value; and
generating the basin score by aggregating the presence score of each vectorized polygon of the first set of vectorized polygons; and
displaying, by the interactive empirical database and for use in determining an area in which drilling a wellbore would have a greater probability of success, a user interface comprising the basin score of the basin and the map of the geographical area comprising the first set of vectorized polygons overlaid on the map of the geographical area.

2. The computing device of claim 1, wherein generating the basin score includes:
generating, for each vectorized polygon of the first set of vectorized polygons, a weighted predicted value using the predicted value and an area of the vectorized polygon.

3. The computing device of claim 1, wherein the operations further comprise:
generating, based on the geological survey data, a set of effectiveness scores, each effectiveness score indicating a second portion of the basin that includes a predicted degree of effectiveness of the first characteristic; and
generating, based on the set of effectiveness scores, a second set of vectorized polygons that represent the basin, each vectorized polygon of the first set of vectorized polygons representing the second portion of the basin that has a same effectiveness score,
wherein calculating the basin score for the basin further includes:
stacking the second set of vectorized polygons onto the first set of vectorized polygons; and
adding new vectorized polygons to the first set of vectorized polygons based on intersections between vectorized polygons of the first set of vectorized polygons with vectorized polygons of the second set of vectorized polygons.

4. The computing device of claim 3, wherein the basin score is equal to a product of the predicted value of a particular vectorized polygon of the first set of vectorized polygons and the effectiveness score of a vectorized polygon of the second set of vectorized polygons that is stacked on the particular vectorized polygon.

5. The computing device of claim 1, wherein the operations further comprise:
displaying a second basin score of a second basin next to the basin score;
generating, by comparing the second basin score to the first basin score, a first rank of the first basin and a second rank of the second basin; and
displaying, by the interactive empirical database and for use in determining an area in which drilling a wellbore would have a greater probability of success, the first rank of the first basin and the second rank of the second basin.

6. The computing device of claim 1, wherein the first characteristic corresponds to a source rock, a reservoir, or a seal.

7. A method comprising:
receiving, by a processing device, one or more unstructured electronic documents that include geological survey data of a geographical area and geographical coordinates associated with the geographical area, the geographical area including a basin;
extracting, from the one or more unstructured electronic documents, a plurality of vectorized polygons associated with an area of interest of the geographical area;
generating, by the processing device and based on the one or more unstructured electronic documents, an interactive empirical database by:
generating, by the processing device and based on the data unstructured electronic documents, a set of predicted values, each predicted value indicating a probability that a first portion of the basin includes a first characteristic;
generating, by the processing device and based on the set of predicted values, the unstructured electronic documents, and the plurality of vectorized polygons, a first set of vectorized polygons that represent the basin, each vectorized polygon of the first set of polygons representing the first portion of the basin that has a same predicted value;
generating, based on the geographical coordinates, a geographical reference frame associated with the plurality of vectorized polygons;
overlaying, by the processing device, the first set of vectorized polygons onto a map of the geographical area;
calculating, by the processing device, a basin score for the basin by:
generating, by the processing device, a presence score for each vectorized polygon of the first set of vectorized polygons using the predicted value; and
generating, by the processing device, the basin score by aggregating the presence score of each vectorized polygon of the first set of vectorized polygons; and
displaying, by the processing device and the interactive empirical database and for use in determining an area in which drilling a wellbore would have a greater probability of success, a user interface comprising the basin score of the basin and the map of the geographical area comprising the first set of vectorized polygons overlaid on the map of the geographical area.

8. The method of claim 7, wherein generating the basin score includes:
generating, by the processing device, for each vectorized polygon of the first set of vectorized polygons, a weighted predicted value using the predicted value and an area of the vectorized polygon.

9. The method of claim 7, further comprising:
generating, by the processing device and based on the geological survey data, a set of effectiveness scores, each effectiveness score indicating a second portion of the basin that includes a predicted degree of effectiveness of the first characteristic; and
generating, by the processing device and based on the set of effectiveness scores, a second set of vectorized polygons that represent the basin, each vectorized polygon of the second set of vectorized polygons representing the second portion of the basin that has a same effectiveness score;
wherein calculating the basin score for the basin further includes:
stacking by the processing device, the second set of vectorized polygons onto the first set of vectorized polygons; and
adding, by the processing device, new vectorized polygons to the first set of vectorized polygons based on intersections between vectorized polygons of the first set of vectorized polygons with vectorized polygons of the second set of vectorized polygons.

10. The method of claim 9, wherein the basin score is equal to a product of the predicted value of a particular vectorized polygon of the first set of vectorized polygons and the effectiveness score of a vectorized polygon of the second set of vectorized polygons that is stacked on the particular vectorized polygon.

11. The method of claim 7, further comprising:
displaying, by the processing device, a second basin score of a second basin next to the basin score;
generating, by the processing device and by comparing the second basin score to the first basin score, a first rank of the first basin and a second rank of the second basin; and
displaying, by the interactive empirical database and for use in determining an area in which drilling a wellbore would have a greater probability of success, the first rank of the first basin and the second rank of the second basin.

12. The method of claim 7, wherein the first characteristic corresponds to a source rock, a reservoir, or a seal.

13. A non-transitory computer-readable medium that includes instructions that are executable by a processing device for causing the processing device to perform operations comprising:
receiving one or more unstructured electronic documents that include geological survey data of a geographical area and geographical coordinates associated with the geographical area, the geographical area including a basin;
extracting, from the one or more unstructured electronic documents, a plurality of vectorized polygons associated with an area of interest of the geographical area;
generating, based on the one or more unstructured electronic documents, an interactive empirical database by:
generating, based on the data unstructured electronic documents, a set of predicted values, each predicted value indicating a probability that a first portion of the basin includes a first characteristic;
generating, based on the set of predicted values, the unstructured electronic documents, and the plurality of vectorized polygons, a first set of vectorized polygons that represent the basin, each polygon of the first set of vectorized polygons representing the first portion of the basin that has a same predicted value;
generating, based on the geographical coordinates, a geographical reference frame associated with the plurality of vectorized polygons;
overlaying the first set of vectorized polygons onto a map of the geographical area;
calculating a basin score for the basin by:
generating a presence score for each vectorized polygon of the first set of vectorized polygons using the predicted value; and
generating the basin score by aggregating the presence score of each vectorized polygon of the first set of vectorized polygons; and displaying, by the interactive empirical database and for use in determining an area in which drilling a wellbore would have a greater probability of success, a user interface comprising the basin score of the basin and the map of the geographical area comprising the first set of vectorized polygons overlaid on the map of the geographical area.

14. The non-transitory computer-readable medium of claim 13, wherein generating the basin score includes:

generating, for each vectorized polygon of the first set of vectorized polygons, a weighted predicted value using the predicted value and an area of the vectorized polygon.

15. The non-transitory computer-readable medium of claim 13, wherein the operations further comprise:

generating, based on the geological survey data, a set of effectiveness scores, each effectiveness score indicating a second portion of the basin that includes a predicted degree of effectiveness of the first characteristic; and generating, based on the set of effectiveness scores, a second set of polygons that represent the basin, each vectorized polygon of the first set of vectorized polygons representing the second portion of the basin that has a same effectiveness score, wherein calculating the basin score for the basin further includes:

stacking the second set of vectorized polygons onto the first set of vectorized polygons; and adding new vectorized polygons to the first set of vectorized polygons based on intersections between polygons of the first set of vectorized polygons with vectorized polygons of the second set of vectorized polygons.

16. The non-transitory computer-readable medium of claim 15, wherein the basin score is equal to a product of the predicted value of a particular vectorized polygon of the first set of vectorized polygons and the effectiveness score of a vectorized polygon of the second set of vectorized polygons that is stacked on the particular vectorized polygon.

17. The non-transitory computer-readable medium of claim 15, wherein the operations further comprise:

displaying a second basin score of a second basin next to the basin score;

generating, by comparing the second basin score to the first basin score, a first rank of the first basin and a second rank of the second basin; and displaying, by the interactive empirical database and for use in determining an area in which drilling a wellbore would have a greater probability of success, the first rank of the first basin and the second rank of the second basin.

\* \* \* \* \*